3,356,566
INSECT REPELLENTS
Lyle D. Goodhue, Bartlesville, Okla., assignor to Phillips Petroleum Company, a corporation of Delaware
No Drawing. Filed Sept. 26, 1963, Ser. No. 311,660
6 Claims. (Cl. 167—22)

ABSTRACT OF THE DISCLOSURE

The repelling of insects is achieved by the subjecting of same to the action of an alkylthio-substituted ketone.

This invention relates to a method of repelling insects. In one of its aspects, the invention relates to repelling insects by subjecting them to an effective quantity of an alkythio-substituted ketone. In a further aspect, the invention relates to compositions for repelling insects containing as an essential active ingredient therein an effective quantity of one of the alkylthio-substituted ketones of this invention.

It is recognized that an insecticide is a material which will kill an insect, whereas a repellent will serve to prevent or deter the insect from frequenting a particular location. Insecticides and repellents are widely used for the control of insects. In many cases, insecticides are chosen when it is desired to kill the insects and completely rid an area, such as a house, of the pests. On the other hand, it is often more desirable to employ repellents, particularly when dealing with roaches and particularly in such locations as restaurants and stores where the sight of such pests has a definite effect on the customer.

Accordingly, it is an object of this invention to provide a method of repelling insects. It is a further object of this invention to provide a composition effective in repelling insects. It is a further object of the invention to provide a method for repelling fruit flies. It is a still further object of the invention to provide a method for repelling roaches.

Other aspects, objects and advantages will be readily apparent to those skilled in the art from a study of the disclosure and the appended claim.

According to this invention, I have discovered that ketones of the formula

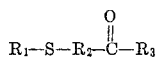

wherein $R_1$ is an alkyl radical containing from 4 to 12 carbon atoms, inclusive, $R_2$ is an alkylene radical containing from 1 to 8 carbon atoms, inclusive, and $R_3$ is selected from the group consisting of alkyl, aryl, cycloalkyl, aralkyl, alkylcycloalkyl, cycloalkylalkyl, and alkaryl radicals containing from 1 to 8 carbon atoms, inclusive, are effective insect repellents and are particularly suitable for repelling roaches and fruit flies (Drosophila).

Examples of compounds of the above general formula which can be employed as insect repellents are: n-butylthiomethyl methyl ketone, 2-(sec-butylthio)ethyl ethyl ketone, 3-(tert - butylthio) - 2 - methylpropyl isopropyl ketone, 4-(n-hexylthio) - 3,3 - dimethylbutyl n-pentyl ketone, n-octylthiomethyl methyl ketone, 4-(n-octylthio)butyl methyl ketone, 8-(n-dodecylthio)octyl n-octyl ketone, 5-(n-decylthio)-4-isopropylpentyl phenyl ketone, 8-(n-hexylthio)octyl cyclohexyl ketone, 2-(tert-amylthio)ethyl benzyl ketone, 3-(n-butylthio)propyl 4-ethylphenyl ketone, 5-(n-amylthio)pentyl cyclooctyl ketone, n-decylthiomethyl 2-phenylethyl ketone, 8-(sec-heptylthio)octyl 4-ethylcyclohexyl ketone, 8 - (n - dodecylthio)octyl 2-phenylethyl ketone, 4-(n-butylthio)butyl 4-methylcyclohexyl ketone, 8 - (n - hexylthio)octyl cyclohexylmethyl ketone, and the like.

The repellents of this invention can be prepared in a variety of ways. For example, n-octylthiomethyl methyl ketone can be prepared by the raction of chloroacetone with the sodium mercaptide of n-octyl mercaptan.

The inventive repellents can be applied by conventional methods such as in solutions, emulsions, dusts, wettable powders, aerosol dispersants, and the like. Sulfides which can be employed include such materials as naphtha, kerosene, toluene, cyclohexanone, acetone, and the like. One particularly effective sulfide which can be used is an isoparaffinic hydrocarbon boiling in the approximate range of 260–800° F. and is usually produced by the HF alkylation of an isoparaffin with an olefin.

The repellent can be employed in admixture with other repellents, if desired, or in various pest control compositions.

The amount of repellent in these solutions, emulsions, etc., can vary over a wide range but will generally be within the range of from 0.05 to 20 percent by weight. In some instances even lower concentrations can be employed, while the upper limit is dictated primarily by economics.

When applying the inventive repellents to an area from which it is desired to repel roaches, the method of application will be chosen so as to deposit from 0.1 to 25 grams per 100 square feet. It is also to be understood that these repellents can be used as spaced sprays, employing such means as aerosol bombs.

The following specific example is intended to illustrate the advantages of the novel roach repellents of the invention. However, it is not intended to limit the invention to the specific compounds and concentrations shown in the example.

EXAMPLE

An olfactometer was employed to evaluate the response of roaches to the vapor phase of one of the alkylthio-substituted ketones of this invention. The test apparatus consisting of two glass cylinders, the inside surfaces of which were sand blasted to prevent the roaches from crawling up the sides. A fine wire screen of the same size as the internal diameter of each cylinder was placed 5 inches from the base. In each glass cylinder a piece of cardboard was placed below the screen which acted as a partition in separating the air flows from the flared glass tubes. The larger end of each tube was covered with a large piece of facial tissue treated with either acetone or acetone solutions of the candidate chemical. Approximately 0.04 ml. of acetone or an acetone solution was applied to the facial tissue in each case. German roaches, including adult males, females and nymphs were placed in pint cartons approximately 1 hour before being used in the test. The olfactometer apparatus was then assembled with German roaches in each cylinder. A water vacuum pump was employed as the driving force for the air stream in the olfactometer apparatus and the uniformity of the air flow in each cylinder was balanced by a flowmeter. Roaches were able to select between a gentle air stream containing vaporized candidate compound or an uncontaminated air stream. Repellency was calculated by the formula $$\frac{\text{Untreated} - \text{Treated}}{\text{Total}} \times 100 = \text{Percent repellency}$$

When n-octylthiomethyl methyl ketone was tested by this procedure, the compound proved to be 70 to 80 percent repellent when a 1 percent by weight acetone solution of this compound was applied to the facial tissue on one side of the olfactometer apparatus.

Reasonable variations of this invention can be made, or followed, in view of the foregoing disclosure without departing from the spirit or scope thereof.

I claim:
1. A method for repelling an insect which comprises subjecting said insect to a repelling amount of at least one compound of the formula

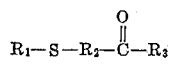

wherein $R_1$ is an alkyl radical of from 4 to 12 carbon atoms, inclusive, $R_2$ is an alkylene radical of from 1 to 8 carbon atoms, inclusive, and $R_3$ is selected from the group consisting of alkyl, aryl, cycloalkyl, aralkyl, alkylcycloalkyl, cycloalkylalkyl, and alkaryl radicals of from 1 to 8 carbon atoms, inclusive.

2. A method according to claim 1 wherein the insects repelled are fruit flies.

3. A method according to claim 1 wherein the insects repelled are roaches.

4. A method according to claim 1 for repelling fruit flies which comprises subjecting said fruit flies to a repelling amount of n-octylthiomethyl methyl ketone.

5. A method according to claim 1 for repelling roaches which comprises subjecting said roaches to a repelling amount of n-octylthiomethyl methyl ketone.

6. A method according to claim 1 for repelling an insect which comprises subjecting said insects to a repelling amount of n-octylthiomethyl methyl ketone.

References Cited

UNITED STATES PATENTS

Long, Journ. Amer. Chem. Soc., 68, pp. 2159–2161 (1946).

ALBERT T. MEYERS, *Primary Examiner.*

S. FRIEDMAN, *Assistant Examiner.*